United States Patent
Kashyap

(10) Patent No.: US 7,092,972 B2
(45) Date of Patent: Aug. 15, 2006

(54) DELTA TRANSFERS IN DISTRIBUTED FILE SYSTEMS

(75) Inventor: Ravi Kashyap, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 419 days.

(21) Appl. No.: 10/142,413

(22) Filed: May 9, 2002

(65) Prior Publication Data

US 2003/0212717 A1    Nov. 13, 2003

(51) Int. Cl.
*G06F 12/00* (2006.01)

(52) U.S. Cl. ......................................... 707/203; 707/10

(58) Field of Classification Search .............. 707/1–10, 707/100–104.1, 200–205; 709/201; 704/275
See application file for complete search history.

(56) References Cited

U.S. PATENT DOCUMENTS

| | | | |
|---|---|---|---|
| 5,916,307 A | 6/1999 | Piskiel et al. | |
| 6,278,976 B1 | 8/2001 | Kochian | |
| 6,295,541 B1 | 9/2001 | Bodnar et al. | |
| 6,401,104 B1 | 6/2002 | LaRue et al. | |
| 6,401,136 B1 | 6/2002 | Britton et al. | |
| 6,477,545 B1 | 11/2002 | LaRue | |
| 6,529,932 B1 | 3/2003 | Dadiomov et al. | |
| 6,546,428 B1 | 4/2003 | Baber et al. | |
| 6,640,325 B1 | 10/2003 | Fischer | |
| 6,654,355 B1 | 11/2003 | Marbach et al. | |
| 6,665,644 B1* | 12/2003 | Kanevsky et al. | 704/275 |
| 6,718,361 B1* | 4/2004 | Basani et al. | 709/201 |
| 2003/0145020 A1 | 7/2003 | Ngo et al. | |
| 2003/0212763 A1 | 11/2003 | Kashyap | |
| 2003/0212813 A1 | 11/2003 | Kashyap | |
| 2005/0055382 A1 | 3/2005 | Ferrat et al. | |

* cited by examiner

*Primary Examiner*—Mohammad Ali
(74) *Attorney, Agent, or Firm*—Blakely, Sokoloff, Taylor & Zafman LLP

(57) ABSTRACT

Disclosed are novel methods and apparatus for delta transfers in distributed file systems. In an embodiment, a communication system for transferring a delta of a file is disclosed. The communication system includes a sender site, a file transfer system, and a receiver site. The sender site includes a database with a trove section and a transfer section. The file transfer system includes a trove reader and a transfer reader. The trove reader may communicate with the trove and transfer sections. The transfer reader may have access to the transfer section. The receiver site receives the file delta from the transfer reader. The receiver site includes a file installer, which patches a previously installed version of the file with the file delta.

19 Claims, 5 Drawing Sheets

DELTA TRANSFERS IN DISTRIBUTED FILE SYSTEMS

CROSS-REFERENCE TO RELATED APPLICATIONS

This application relates to application Ser. No. 10/143,313, entitled "Distributed Configuration-Managed File Synchronization Systems," and application Ser. No. 10/143,191, entitled "Persistent Queuing for Distributed File Systems," both filed concurrently herewith and in the name of the present assignee. All these documents are hereby incorporated by reference for all purposes.

FIELD OF INVENTION

The subject of this application relates generally to the field of data transfer. More particularly, an embodiment of the present invention relates to delta transfers in distributed file systems.

BACKGROUND OF INVENTION

As the use of digital data becomes more prominent in everyday life, the need for access to reliable data sources increases. For example, a user may need regular access to data that can be physically located across different buildings or even around the world. This is often the case with respect to large company projects that may involve many groups worldwide working on a same solution.

As these types of joint projects become more commonplace, so does the need for having access to such data in real-time. In other words, the data accessed by each remote site will need to be current whether that data is stored locally or halfway around the world. Accordingly, the users need to have access to the latest version of the data as soon as it is released into the system from any site.

In many current implementations utilizing transmission control protocol/Internet protocol (TCP/IP), file transfer protocol (FTP), and other similar facilities (e.g., RSYNC command provided in Unix systems) are utilized to maintain data amongst remote sites. These tools, however, are generally useful only for transferring files from one point to the next. Moreover, automation of these tools only results in synchronization among multiple sites when a batch update or a nightly synchronization is performed. Also, if one of the remote sites goes down or cannot accept external data, the data may be dropped and unavailable.

One of the biggest challenges for a distributed file system is the efficient utilization of the available network bandwidth. This can be key to an effective real-time file synchronization utility, especially in a large multi-user community sprawled across a country or even the globe. The RSYNC utility uses an internal computation for transferring only the change in data to a remote site. This internal computation, however, cannot be harnessed by a multi-site file system using, for example, a revision control system (RCS) at the backend. Also, the RSYNC utility computes the change on an entire file without regard for different versions of a same file.

SUMMARY OF INVENTION

The present invention, which may be implemented utilizing a general-purpose digital computer, includes novel methods and apparatus to provide delta transfers in distributed file systems that can provide ready access to data among remote users. In an embodiment, a communication system for transferring a delta of a file is disclosed. The communication system includes a sender site, a file transfer system, and a receiver site. The sender site includes a database with a trove section and a transfer section. The file transfer system includes a trove reader and a transfer reader. The trove reader may communicate with the trove and transfer sections. The transfer reader may have access to the transfer section. The receiver site receives the file delta from the transfer reader. The receiver site includes a file installer, which patches a previously installed version of the file with the file delta.

In another embodiment, the communication system utilizes an available bandwidth more efficiently by transferring the file delta between the sender site and the receiver site.

In a further embodiment, a method of transferring a delta of a file is disclosed. The method includes providing a sender site, a file transfer system, and a receiver site. The sender site includes a database, which has a trove section and a transfer section. The file transfer system has a trove reader and a transfer reader. The trove reader communicates with the trove and transfer sections. The transfer reader has access to the transfer section. The receiver site receives the file delta from the transfer reader. The receiver site includes a file installer, which patches a previously installed version of the file with the file delta.

BRIEF DESCRIPTION OF DRAWINGS

The present invention may be better understood and its numerous objects, features, and advantages made apparent to those skilled in the art by reference to the accompanying drawings. These drawings, however, should not be taken to limit the invention to the specific embodiments, but are for explanation and understanding only.

The use of the same reference symbols in different drawings indicates similar or identical items.

DETAILED DESCRIPTION

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
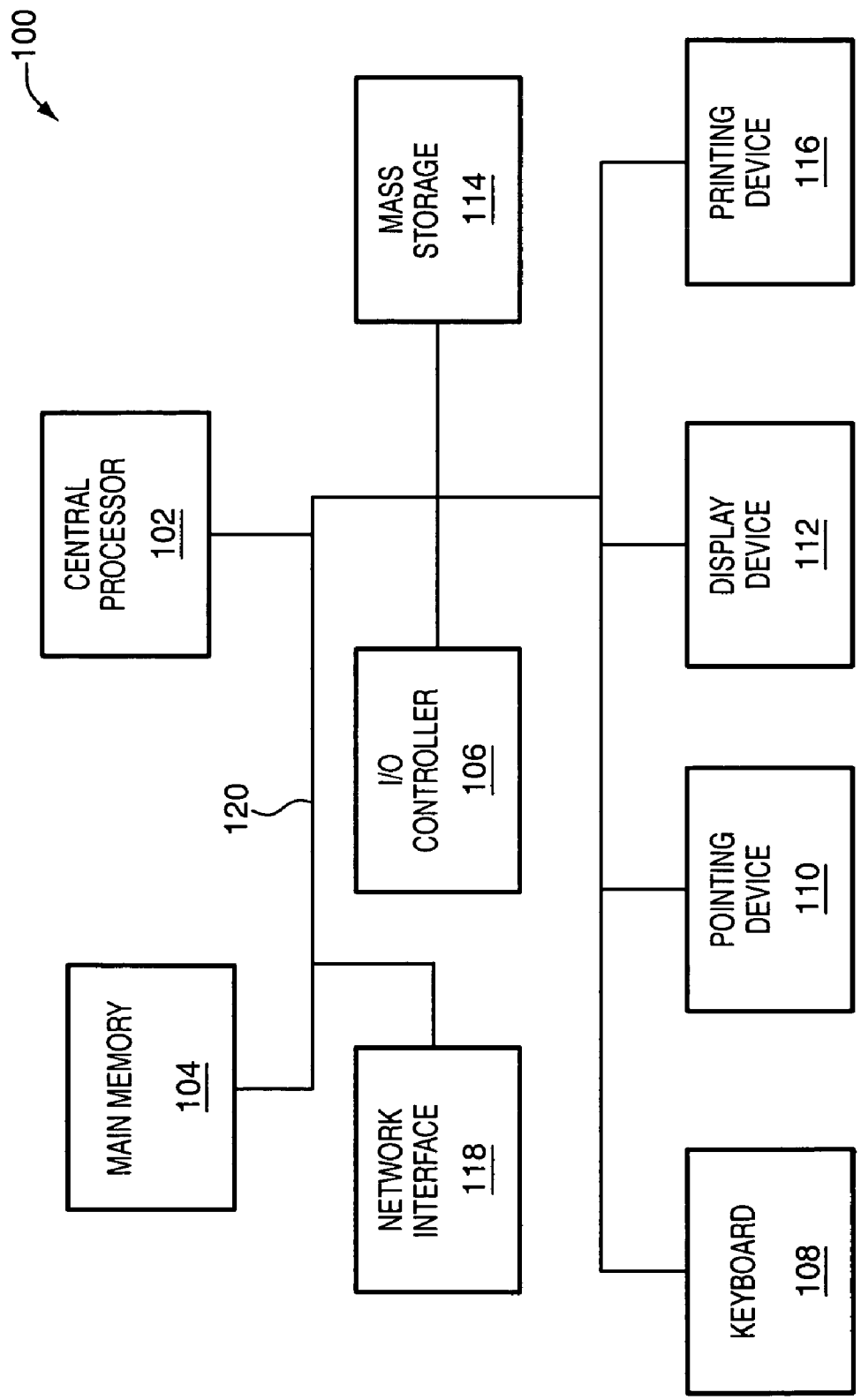
FIG. 1 illustrates an exemplary computer system 100 in which the present invention may be embodied.

FIG. 1 illustrates an exemplary computer system 100 in which the present invention may be embodied in certain embodiments. The system 100 comprises a central processor 102, a main memory 104, an input/output (I/O) controller 106, a keyboard 108, a pointing device 110 (e.g., mouse, track ball, pen device, or the like), a display device 112, a mass storage 114 (e.g., hard disk, optical drive, or the like), and a network interface 118. Additional input/output devices, such as a printing device 116, may be included in the system 100 as desired. As illustrated, the various components of the system 100 communicate through a system bus 120 or similar architecture.

In an embodiment, the computer system 100 includes a Sun Microsystems computer utilizing a SPARC microprocessor available from several vendors (including Sun Microsystems of Palo Alto, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.). Also, instead of a single processor, two or more processors (whether on a single chip or on separate chips) can be utilized to provide speedup in operations. It is further envisioned that the processor 102 may be a complex instruction set computer (CISC) microprocessor, a reduced instruction set computing (RISC) microprocessor, a very long instruction word (VLIW) microprocessor, a processor implementing a combination of instruction sets, and the like.

The network interface 118 provides communication capability with other computer systems on a same local network, on a different network connected via modems and the like to the present network, or to other computers across the Internet. In various embodiments, the network interface 118 can be implemented in Ethernet, Fast Ethernet, wide-area network (WAN), leased line (such as T1, T3, optical carrier 3 (OC3), and the like), digital subscriber line (DSL and its varieties such as high bit-rate DSL (HDSL), integrated services digital network DSL (IDSL), and the like), time division multiplexing (TDM), asynchronous transfer mode (ATM), satellite, cable modem, and FireWire.

Moreover, the computer system 100 may utilize operating systems such as Solaris, Windows (and its varieties such as NT, 2000, XP, ME, and the like), HP-UX, IBM-AIX, Unix, Berkeley software distribution (BSD) Unix, Linux, Apple Unix (AUX), and the like. Also, it is envisioned that in certain embodiments, the computer system 100 is a general purpose computer capable of running any number of applications such as those available from companies including Oracle, Siebel, Unisys, Microsoft, and the like.

It is envisioned that the present invention may be applied to systems, which utilize RCS and meta data information, individually or in combination. The RCS can be configured as a backend storage system including the actual files. It is envisioned that RCS may be hidden from users. The meta data information can include data about the actual files. The meta data may be stored in a database, such as that provided by Sybase, Inc., of Emeryville, Calif. The meta data may include relational information, block and sector information, file type, and the like.

Figure 2:
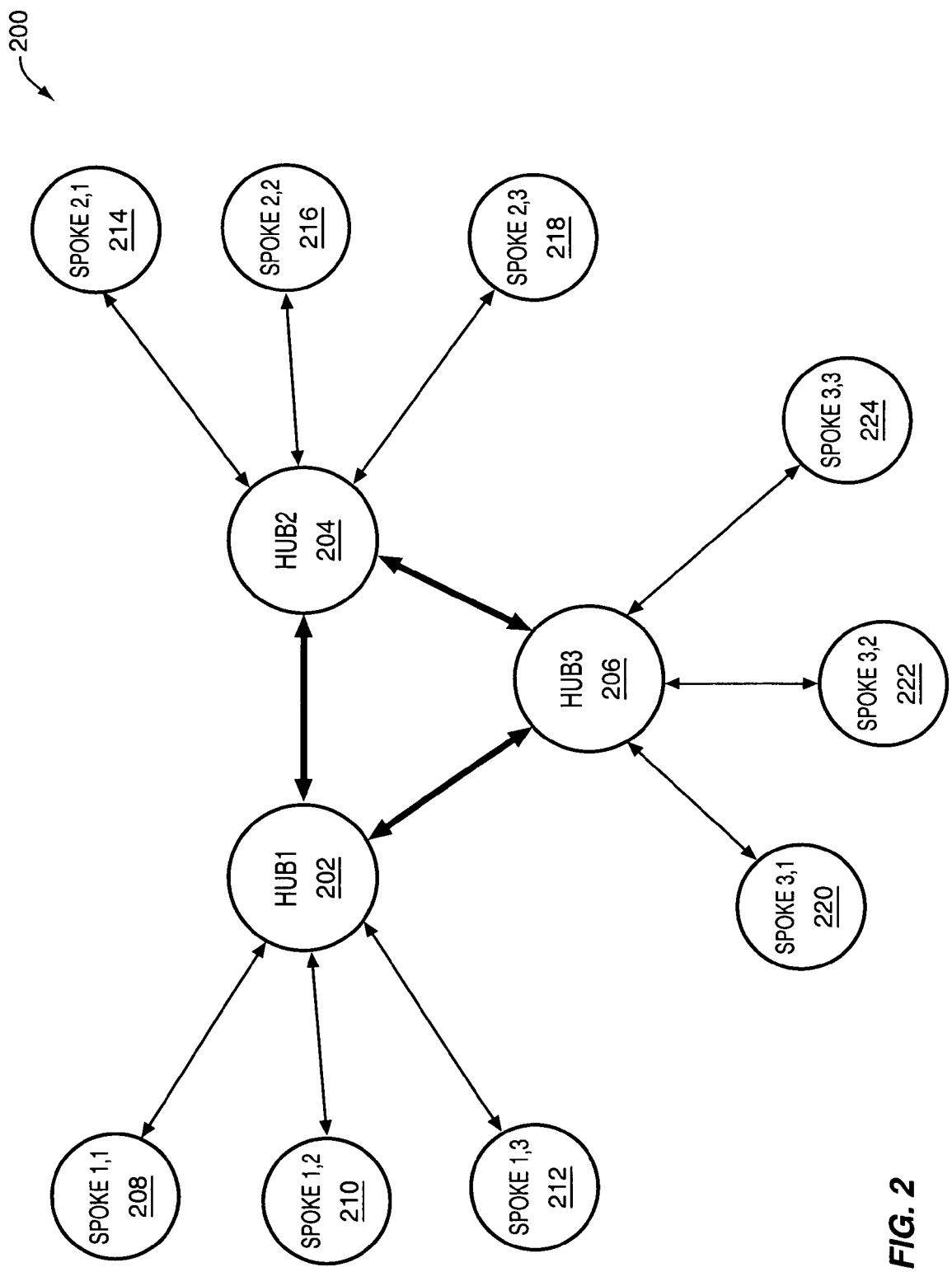
FIG. 2 illustrates an exemplary network configuration 200 in accordance with an embodiment of a present invention.

FIG. 2 illustrates an exemplary network configuration 200 in accordance with an embodiment of a present invention. As illustrated, the network configuration 200 includes three hubs (Hub1 202, Hub2 204, and Hub3 206) as an example. The hubs may be configured to communicate with each other through any number of networking tools including a point-to-point connection. Each of these hubs may have their own spokes. For example, Hub1 202 may have spokes 208, 210, and 212. Similarly, Hub2 204 may have spokes 214–218 and Hub3 may have spokes 220–224. All spokes on a single site may be grouped together to form a local subnet (e.g., with one hub and multiple spokes). Each remote site may be connected in a star topology (e.g., with the hub at the center of the star).

Each spoke may have a set of configuration parameters defined in a local or remote database. When the spoke is brought up, the spoke may utilize the configuration parameters to configure itself or auto-configure. Accordingly, each site may be easily reconfigured by, for example, changing the entries in the database that contains the configuration data for each site. Each spoke (208–224, for example) can have the following configuration parameters defined, in addition to any already existing ones:

VectorIn: a vector that contains the list of Ids for sites (siteIds) that send files to the spoke;

VectorOut: a vector that contains the list of siteIds that receive files from the spoke; and/or Pass Through or Store-N-Go Field: this field indicates to the spoke whether that spoke is just a connector or a hub (for example, with a buffer and no central directory) or a spoke (which, for example, makes a copy of the file it is transferring into the spoke's central directory).

Depending on the above parameters, each spoke can then become a hub or a spoke. Furthermore, in an embodiment, all hubs need not be in pass-through mode, and all spokes may be in store-n-go mode. For example, on a site, if there is a single spoke, it is unnecessary to add another hub on the same site. The only spoke can then act as a hub in store-n-go mode. So, each site may be configured as per the requirements at that site. In an embodiment, some of the advantages of such architecture are that each site only transfers the file once to the other sites, but not to each spoke. This reduces network traffic. Also, such architecture is very scalable, and is highly flexible to accommodate different configurations at each site.

In some embodiments, it is envisioned that hubs may not have users working on them. So, no new files may be created on such hubs. In case a hub hosts users, that hub may be configured similar to a spoke. For example, that hub can transfer the given file locally to all spokes, and transfer a copy to each of the remote hubs.

It is envisioned that a hub may differentiate between the local-domain generated file and the file that it received from a foreign domain. In one embodiment, the receiving entity (or module), for example upon receiving a file, can check to see if the origin site of the file is the same domain as the hub. If so, the file does not need to be routed any further and can be just locally copied. On the other hand, if the domain of the origin site is different, the hub knows that it has to transfer a copy of the file to each of the local spokes.

It is also envisioned that this checking may be performed by, for example, employing a FileReceiver module. The FileReceiver module can receive files and may run as a thread on a general-purpose computer or an appropriate networking device. The FileReceiver upon receiving a file may: (1) ensure that the received file is accurate (for example, by performing checksum validations) and/or (2) check the file origin (and if the file is foreign, the FileReceiver can route the received file locally). In an embodiment, the step (2) above can be done by the FileReceiver present on a hub rather than on a spoke. In an embodiment, if the FileReceiver module has to route the file, the FileReceiver module can insert entries into, for example, a transfer table in a database (e.g., locally). In one embodiment, there can be one entry per each local spoke in the database. Another process, e.g., a database reader (DBReader such as that discussed with respect to FIG. 3), can then handle additional work for transferring the file.

Accordingly, the routing information can be stored in a database. In an embodiment, with the above-proposed architecture, each hub may know which domain it belongs to, and what spokes exist on its local domain. Also, each spoke may know to which other spokes and hubs is it directly connected. For example, an entry in a transfer table can be inserted for each spoke and/or hub that the given local spoke is directly connected to. In certain embodiments, the DBReader module on the local spoke can then handle or initiate the transfers.

Figure 3:
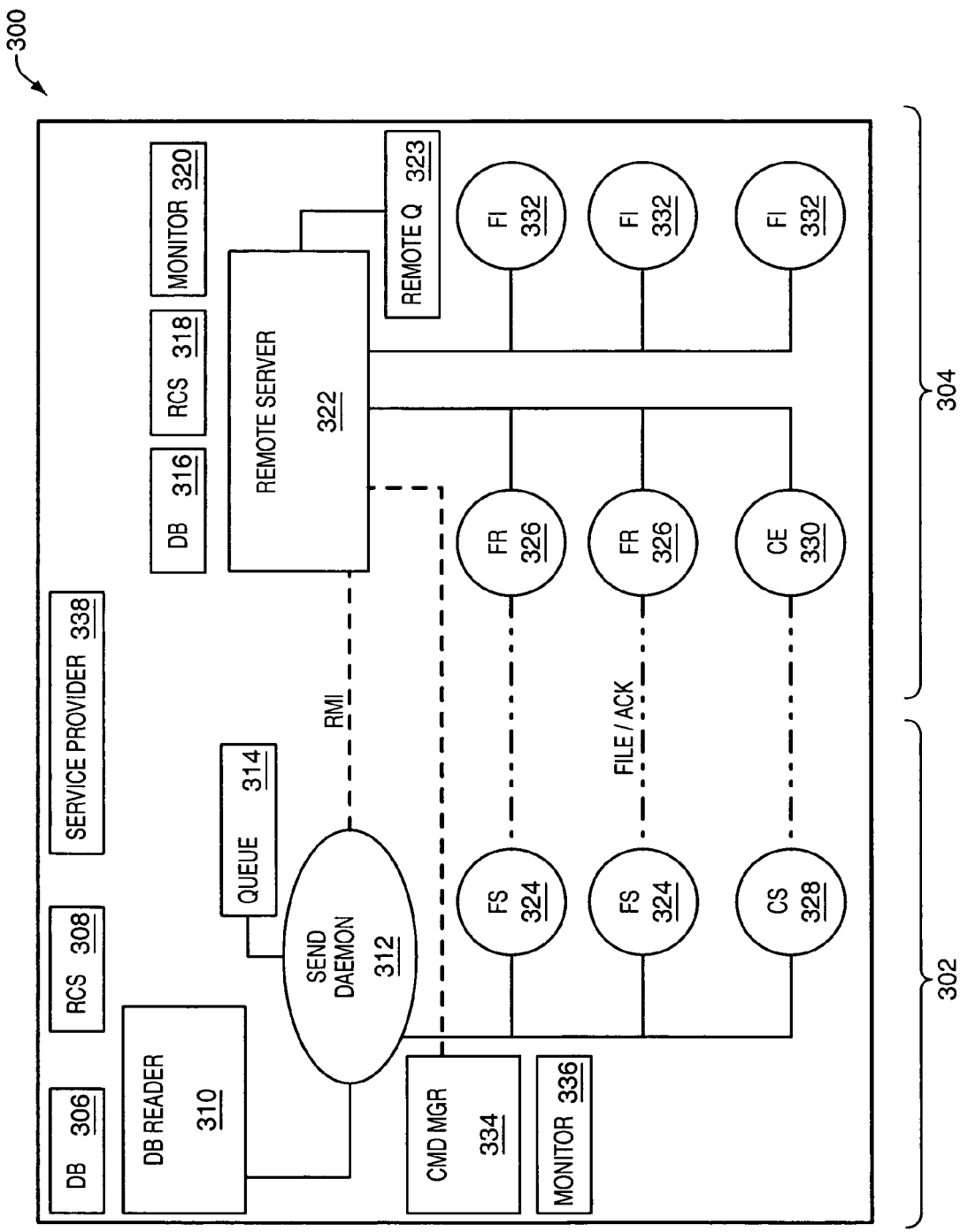
FIG. 3 illustrates an exemplary communication system 300 in accordance with an embodiment of a present invention.

FIG. 3 illustrates an exemplary communication system 300 in accordance with an embodiment of a present invention. The communication system 300 includes a sender site 302 and a receiver site 304. The sender site 302 includes a database 306 (DB), an RCS 308, a DBReader module 310, and a send daemon 312. It is envisioned that the database 306 may store meta data and other data as required. The RCS may be hidden from users and store actual files being transferred and/or maintained on the sender site 302. The DBReader module 310 can be a process that may run on a computer system (such as that discussed with respect to FIG. 1). In certain embodiments, the DBReader module 310 may be run on a multitasking system as a process, for example. The DBReader module 310 may run on a system continuously. It is envisioned that the DBReader module 310 has access to the database 306 and the RCS 308, and can process the stored data. The DBReader module 310 may initiate a file transfer process by, for example, reading a job description from a transfer table stored, for example, in the database 306.

In an embodiment, the DBReader module 310 may further communicate with the send daemon 312. It is envisioned that the send daemon 312 can be responsible for sending data from the sender site 302 to the receiver site 304. The send daemon 312 can be a Unix daemon thread or other similarly configured process running on a computer system. The send daemon 312 may be configured to run in the background so it can be activated with short notice. In one embodiment, the send daemon 312 may be a thread spawned from the DBReader module 310.

The send daemon 312 may have access to a local queue 314 (internal or external to the send daemon 312). The local queue 314 may provide storage capabilities to the send daemon 312. It is envisioned that the local queue 314 may be any type of storage such as random access memory (RAM), its varieties such as dynamic RAM (DRAM), static RAM (SRAM), synchronous DRAM (SDRAM), and the like. Further information regarding the local queue 314 may be found by reference to FIG. 4.

The receiver site 304 includes a database 316, an RCS 318, a monitor 320, and a remote server 322. The database 316 and RCS 318 may be similar to those of the sender site 302 (i.e., database 306 and RCS 308). The monitor 320 can be on lookout for information of interest and inform a selected party (e.g., a user) about the status of the information desired. For example, the monitor 320 may be a visual aid indicating status of a transfer in real-time. The remote server 322 can have access to the database 316, RCS 318, and monitor 320. The remote server 322 may also have access to a remote queue 323 (RemoteQ). The remote queue 323 may be a similar device such as that discussed with respect to the local queue 314. The remote queue 323 can provide the remote server 322 with storage capabilities. It is envisioned that the remote queue 323 may store meta data for the receiver site 304. Also, the remote queue 323 may provide memory for delivered job descriptions which are uninstalled. Further information regarding the remote queue 323 may be found by reference to FIG. 5.

The sender site 302 can also include one or more file sender(s) 324 which may communicate with one or more, respective, file receiver(s) 326. This communication may also utilize acknowledge capabilities to ensure a file is properly transferred. Other error correction capabilities may also be used to ensure proper communication between the file senders 324 and file receivers 326. Such error correction capabilities may include parity checking, M0–5 checksum validation, and the like. The file senders 324 may hold all information about the file that is being transferred. Further, it is envisioned that the file sender 324 may perform one or more of the following: physically transfer a file from the sender site 302 to the receiver site 304, obtain acknowledgment regarding the transfer, update a ReceivedTime field (indicating when the data sent was received), for example, in the transfer table that may be stored in the database 306. The file sender 324 can be a thread spawned by the send daemon 312.

The file receiver 326 may be responsible for one or more of the following tasks: receiving files over, for example, a TCP socket, re-calculating the checksum, verifying file correctness, copying the file into the designated buffer area, sending an ACK/NAK signal (to acknowledge receipt or non-receipt), remove the current entry (or row) from queue of the remote server 322, and update the file receiver count at the remote server 322. In some embodiments, the file receiver 326 may be a thread spawned by a remote server routine.

The sender site 302 can additionally include a command sender 328 for sending commands from the sender site 302 to a command executor (CE) 330 on the receiver site 304. It is envisioned that the command sender 328 may perform one or more of the following: start a server socket, wait for the acknowledgment from the command executor 330, and update the appropriate database (such as the database 316). Moreover, the command sender 328 may be a thread spawned by the remote server 322. Furthermore, the command executor 330 may perform one or more of the following: connect to the command sender 328, execute the command (e.g., copy data, delete data, and/or delete directory), send acknowledgment, and update information about when an action is done in an appropriate database (such as the database 316). Moreover, the command executor 330 may be a thread spawned by the remote server 322.

In an embodiment, the sender site 302 can include a command manager (Cmd Mgr) 334 and a monitor 336. The monitor 336 may be similar to that discussed with respect to the receiver site 304 (i.e., the monitor 320). The command manager 334 is envisioned to be able to communicate (directly or indirectly) with the remote server 322 and to execute commands. Such commands may, for example, include push data and pull data, which can be used to change the priority on a file that is being transferred, so that it is shipped ahead of or after the rest (or select ones) of the current queue members.

The receiver site 304 can further include one or more file installer(s) 332. The file installers 332 may perform one or more of the following: verify whether meta data of predecessor and object being installed are in place, verify whether the RCS 318 of predecessor is in place, install the object into the RCS 318, update object's meta data, send acknowledgment as required, update flags including CompleteTime (indicating the time the installation was complete) and Installation Message (any messages resulting from the installation) on, for example, a source database (where the file being installed is located), and delete any unused buffer files utilized for the installation. It is envisioned that the file installer 332 may be a thread spawned by the remote server 322.

It is also envisioned that the send daemon 312 may perform one or more of the following: perform handshake operations between the sender and receiver sites, initiate a file transfer or a command execution, execute a remote method invocation (RMI) call on the remote server 322, transfer job description, request/provide a port number, spawn a file sender (such as 324) along with passing relevant port information, spawn a command sender (such as 328), wait on the local queue 314 for more jobs, and keep a balance in the number of existing transport channels. Further, the remote server 322 may provide remote methods to the send daemon 312 to initiate a file transfer or a command execution. The remote server 322 may also keep an account on file receiver/file installer counts, spawn the file receivers 326 to receive files, and spawn file installers 332 when the remote queue 323 receives a new member.

The communication system 300 may further include a service provider 338. The service provider 338 may provide a variety of services to the system components including one or more of the following: handling periodic registrations from key modules, subscribing and unsubscribing of available monitoring services, routing the monitor messages to the corresponding monitors, and providing a pointer to the correct log file for remote modules. It is envisioned that one service provider 338 is sufficient for the entire system. In an embodiment, the service provider 338 may run on a primary site.

Also, the communication system 300 may further include a database manager module (not shown), which may provide useful application programming interfaces (APIs) to, for example, insert, update, delete, and select information on various tables in the databases present in the communication system 300. Such a database manager may be implemented as a Java object.

It is envisioned that an interface between a user command and transparent transport layer may be a database. More specifically, this interface may be a transfer table. Such a transfer table may store the required information about each file transfer. Each user command, after successful completion, may in turn deposit a transfer request into the transfer table. Furthermore, it is envisioned that the DB Reader 310 may be present on all sites where there is a possibility of users checking in files. The DB Reader 310 having sensed what needs to be transferred can buffer the jobs into the respective queues of the destinations. It also can spawn the send daemon 312, for each destination and from then on, it may hand over the corresponding queue to it. The send daemon 312 may then handle the handshake between itself and the remote server 322, and establish full-duplex communication channels for example, to transfer files and receive acknowledgments. This may involve creation of file sender—file receiver pairs (324 and 326, respectively) on sender and receiver sites, respectively. If the command is other than create or save data, the command sender 328 and command executor 330 pairs may be created.

The file sender 324 can transfer a file, and the checksum of that file over the established channel, and wait for the acknowledgment from the file receiver 326. The file receiver 326 having received the file may perform checksum verification between the received checksum, and the re-calculated checksum on the receiver site 304. If they tally, a positive ACK maybe be sent to the file sender 324. Otherwise, a NAK may be sent. Upon receiving an ACK, the file sender 324 may update the ReceivedTime in, for example, the transfer table and exit. On receiving a NAK, the file sender 324 may re-transfer the file. The iteration may be continued until a positive ACK is received, or once the file sender 324 times out. If the file sender 324 times out, it may enter a panic state, and send out emails to an appropriate target (such as a system administrator).

Once a file is received correctly, the file receiver 326 may copy the file to its designated buffer area, and enter the job description into the remote queue 323, and also register the job in an appropriate (e.g., RemoteQ) table in the database 316. In case of the remote server 322 break down, the remote queue 323 may rebuild the required information from the database 316. In such a case, the remote server 322 may start a FileInstaller thread for each file received (such as file installer 332). The FileInstaller can be responsible for the installation of the file in the RCS 318, and for updating a VersionHere bit in a FileVersions table in the database 316. The FileInstaller may perform a series of checks for the presence of both the predecessor's and the file's meta-data, and also the RCS version of the predecessor. Upon having verified all the dependencies, the file may be checked into the RCS 318. Then the FileVersions, TransferConfirm, and RemoteQ tables may be notified of the successful installation, and the CompleteTime and Installation Message entries (or columns) may be set on the source database, i.e., the database on the site where the file originated. This process may complete the file transfer procedure in accordance with an embodiment of the present invention.

The above procedure may be applied where the command is either create or save data. If the command is one of delete data, delete directory, or copy data, a command sender (such as the command sender 328) may be started instead of the file sender 324. The command sender 328 may then wait for the ACK from the corresponding command executor 330. Having received the ACK/NAK, the acknowledgment may be recorded in the database 316, and a panic mail may be sent in case of NAK. In case of delete data or delete directory, a deletor thread may be spawned, for example, as a part of the command sender 328. This thread may wait for the positive acknowledgments from all the sites, for example, from its VectorOut. Having received them, the deletor thread can delete the RCS files from the local central directory, and then clean the meta-data on its site. This process may replicate to other sites, through meta-data replication, for example.

Figure 4:
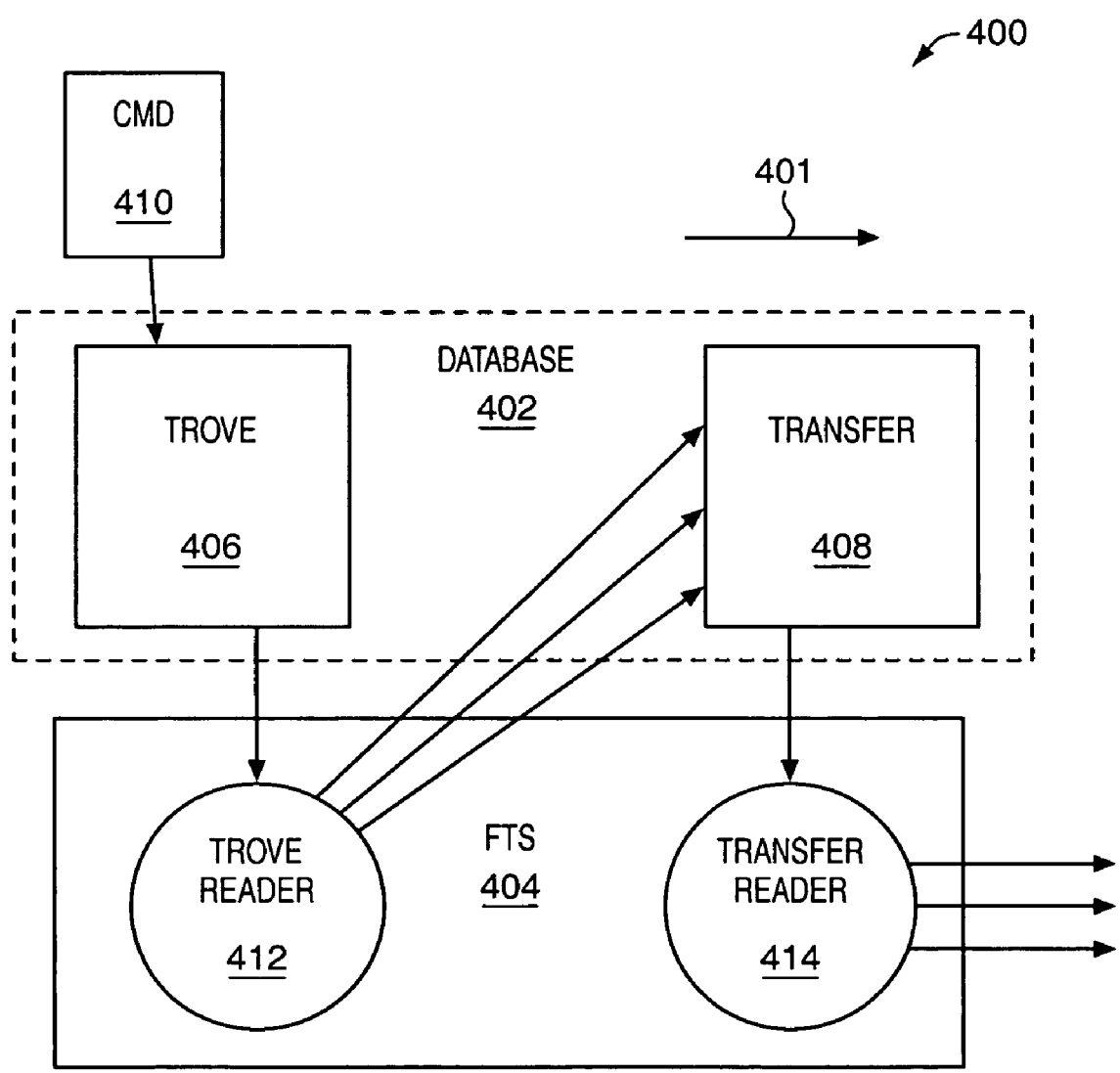
FIG. 4 illustrates an exemplary block diagram of a communication system 400 in accordance with an embodiment of the present invention.

FIG. 4 illustrates an exemplary block diagram of a communication system 400 in accordance with an embodiment of the present invention. In FIG. 4, an arrow 401 illustrates the direction of information flow. A database 402 communicates with a file transfer system (FTS) 404. The FTS 404 may be implemented utilizing techniques discussed with respect to FIG. 3, for example. As illustrated, the database 402 may include a trove section 406 and a transfer section 408 which may in an embodiment be implemented as tables. The trove section 406 may receive commands from a CMD unit 410. It is envisioned that in one embodiment the CMD unit 410 may be a central data management system (CDMS) such as CDMS++. The CMD unit 410 may insert a row into the trove section 406 for each command. The FTS 404 may then determine the current network topology and insert rows into the transfer section 408, as appropriate. In an embodiment, the trove section 406 can be implemented as a vector.

It is envisioned that in an embodiment the trove section 406 may include any combination of the following fields: TroveRowId (a unique row identity generated by the database); Command (name of the CDMS++ command, for example); ObjName (CDMS++ name of the file or directory, for example); ObjId (CDMS++ object identity, for example); Version (RCS version of the object); Branch (CDMS++ branch of the file object, for example); Origin-SiteId (site identity for the site where the transfer request originated); Priority (transfer priority of the object); InsertTime (time when the job was inserted into the trove section by the CDMS++ command, for example); PredName (ObjName of the predecessor of the current object); PredId (ObjectId of the predecessor of the current object); PredType (type of the predecessor object); PredVer (version of the predecessor file object); PredBranch (branch/es of the predecessor file object); FileSize (file size in bytes); ToObjName (destination of ObjName, for example, for a copy data command); ToObjId (destination of ObjId, for example, for a copy data command); ToVersions (list of latest version of all branches for the file that is being copied); StorageType (type of backend storage); DeltaFile (location of the file where the delta will be stored); SiteCounter (maximum number of sites to which the corresponding file has to be transferred); ChkSum (stores the ChkSum field of the delta file); and/or BBlock (which stands for the Byte Block field of the delta file). In an embodiment, the BBlock indicates the number of octets a file can be divided into (or in other words the size of the file).

Additionally, the FTS 404 may include a trove reader 412 and a transfer reader 414. In an embodiment, the transfer reader 414 may be implemented similarly to the DBReader module 310 of FIG. 3. In such an embodiment, it is envisioned that the transfer reader 414 reads both the transfer and trove sections (408 and 406, respectively). In one embodiment, the trove reader 412 communicates with the trove section 406, including reading the contents of the trove section 406, and performs one or more of the following:

1. read and mark each row in the trove section 406 as "READ" once the row is read;
2. set a remote site counter (e.g., a SiteCounter entry), for example, in a column in the trove section 406 to the current maximum number of spokes to which the local site has to physically transfer a file;
3. calculate the change/delta for a file from its previous version if the pending command is to save data (which in turn requires updating the data across all relevant sites);
4. create the delta file including delta information, for example, in a delta directory;
5. insert a row in the transfer table for each of the spokes to which the delta file needs to be transferred (in an embodiment, the delta file may include the corresponding site id's); and/or
6. duplicate the contents of the respective row from the trove section 406 into the transfer section 408.

Moreover, in embodiments similar to those discussed with respect to FIG. 3, in case of a save data command, instead of checking out an RCS file (e.g., the RCS 308) from, for example, a central directory, the file sender (e.g., 324 of FIG. 3) may only send the delta file. The row object, which is passed to the file sender may have a record of where exactly the delta file is stored.

In accordance with an embodiment of the present invention, in case of a save data command, the file installer (e.g., 332 of FIG. 3), instead of checking in the received file directly, may check out the predecessor version from, for example, the central directory, patch it with delta data, and check the new version into the central directory. The file installer may perform these functions after the dependency checks by verifying the checksum of the buffer file. The file installer may further send appropriate acknowledgments after performing its tasks. Furthermore, in an embodiment, in case of a create data command, the file installer may verify the checksum of the buffer file (after the dependency checks), install the file into RCS, and send the appropriate acknowledgements.

With respect to re-routing, in an embodiment, FileReceivers (e.g., file receivers 326 of FIG. 3) may insert one row per transfer job into the trove section 406 as opposed to inserting multiple rows into the transfer section 408. Since the routing, in an embodiment, may already be happening with the trove reader 412, it becomes trivial to re-route transfer requests through the hubs (e.g., hubs of FIG. 2).

In an embodiment, the checksum calculation (discussed with respect to FIG. 3) may no longer be done on the file version identified by the row object of, for example, the DBReader module 310. Instead, checksum verification of the delta data may be calculated by the trove reader 412 and stored in, for example, the transfer section 408.

In a further embodiment, a message digest 5 (MD5 also known as a one-way hash function) verification may be done after the file (including the delta information, for example) has been installed by the file installer. This can be done by checking out the just checked-in version and calculating its respective MD5 and comparing the result with the previous MD5 stored in, for example, the database 316 of FIG. 3. This confirms at least one of the following two items: first, that the file has been installed in RCS; and second, that the file is in fact correctly installed.

In yet another embodiment, there is a pre-assigned directory on each spoke where the trove reader(s) 412 store the delta files. These files need to exist as long as the send daemons on the local spoke have not received positive acknowledgments from their respective remote spokes. After receiving positive acknowledgments, the local delta file can be cleaned. This may be accomplished by making use of the Sybase XP technology in an embodiment. As discussed above, the trove section 406 may have a SiteCounter field which stores the maximum number of sites to which the corresponding file has to be transferred. The SiteCounter is decremented each time an ACK (or positive acknowledgment) is received. Once the counter reaches zero, a trigger may be fired to run a stored procedure, which may in turn make a system call, for example, to perform a cleanup of the corresponding delta file(s).

Figure 5:
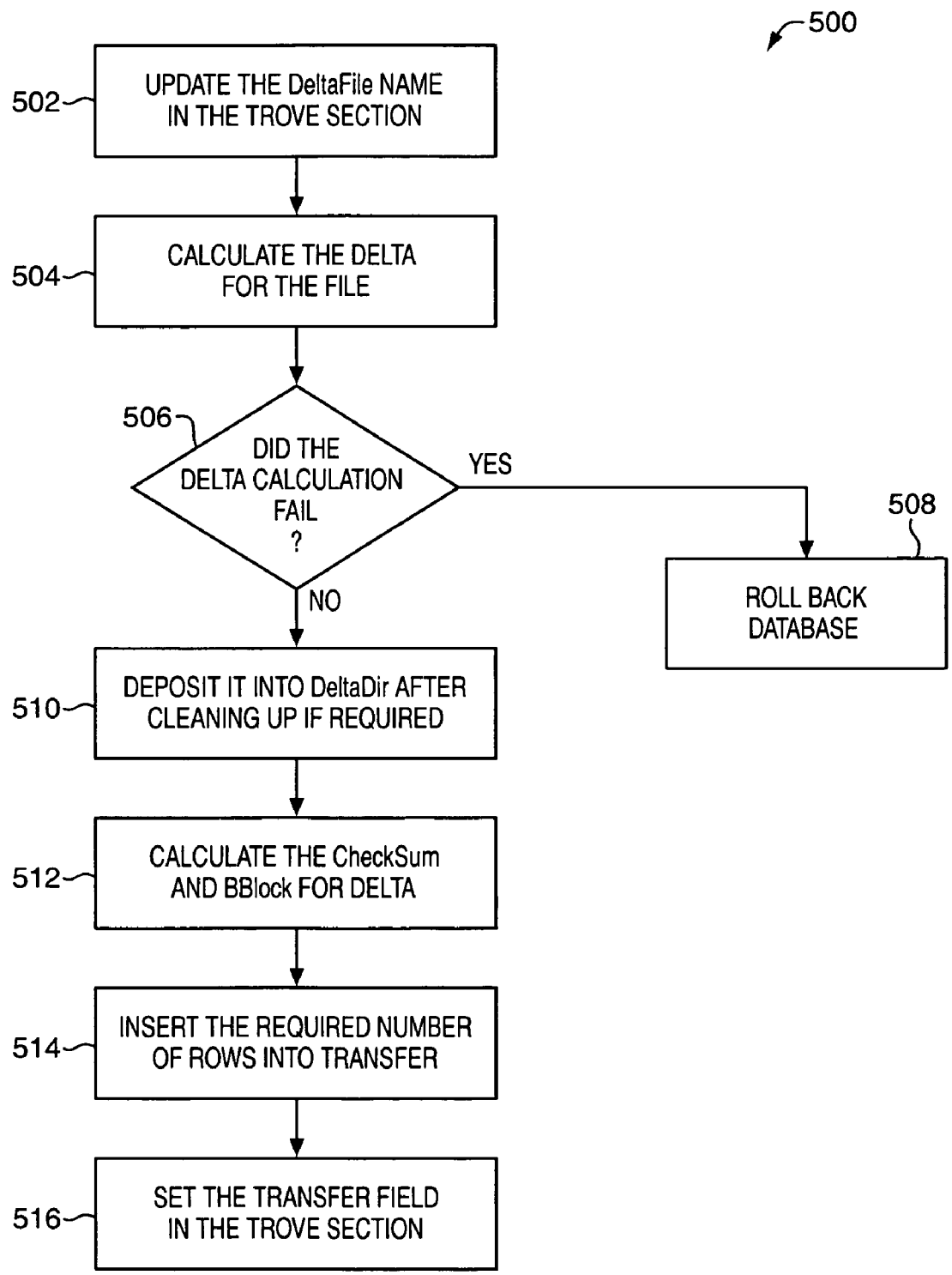
FIG. 5 illustrates an exemplary flow chart of a transfer method 500 in accordance with an embodiment of the present invention.

FIG. 5 illustrates an exemplary flow chart of a transfer method 500 in accordance with an embodiment of the present invention. The transfer method 500 starts a database transaction by a step 502 in which the transfer method 500 updates the delta file name in the trove section, e.g., 406 of FIG. 4 (according to a naming convention where applicable). In a step 504, the delta for the file being transferred is calculated. In a step 506, it is determined whether the delta calculation has failed. In an embodiment, this can be achieved by utilizing MD5 as described herein. If the delta calculation has failed, a step 508 rolls back the database to ensure that false data is not stored. If the delta calculation is successful, the method 500 continues with a step 510 in which the file delta is stored in a delta directory (DeltaDir), after cleaning up if required. In a step 512, the checksum and/or bblock of the file delta are calculated. A step 514 inserts the required number of rows into the transfer section (e.g., 408 of FIG. 4). And, in a step 516, the transfer method 500 ends the database transaction by setting the transfer time field in the trove section (e.g., 406 of FIG. 4).

Therefore, in accordance with some embodiments of the present invention, the procedure for receiving a file at a recipient site is independent of installing the file on the recipient site. This bifurcation is envisioned to yield better performance, be more tunable, provide improved control, and allow for load balancing (for example, among distributed systems). Also, some embodiments of the present invention address the problems associated with keeping live data on a particular site, spoke, or a domain, in sync with the data on multiple remote spokes in real-time. In a user community distributed across a country or anywhere in the globe, the need arises to have select data be available on any site at any time. Embodiments of the present invention provide users access to the latest version of the data as soon as it is released into the system from any site. Therefore, there should not be a need to wait for the new data until there is a batch update or a nightly synchronization, for example.

Additionally, if one of the remote sites is down or cannot accept external data, the systems provided in accordance with some embodiments of the present invention can temporarily store (e.g., buffer or queue) the new data until the remote spoke is back on-line. Further, the system can work with the configuration control mechanisms (CCM) on each site and can install the new data into the CCM on the remote sites. Additionally, the system can work with meta data (if any) in, for example, the backend database storage, so that the user commands or interfaces to the database function accurately during any synchronization process.

Furthermore, in an embodiment, the present invention works with a FTS to extract the difference (or the delta) from a file and its previous version. It then calculates the checksum for the delta. The delta and the checksum are then sent to the appropriate remote sites. This reduces the network traffic and also speeds up the transfer rates. This technique works very well with an FTS and is very useful in terms of doing optimal pre-transfer computations. Also, it is envisioned that this technique is especially helpful in situations where relatively large files, with relatively small deltas, would have to be synchronized across multiple remote sites.

In one embodiment, the present invention takes care of polling the transfer requests from the database, calculating the delta, calculating the checksum, storing them appropriately so that they can be used by all the send daemons that are functional on the current site. In this fashion, each send daemon may read the delta and send it, and need not compute or checkout any file from the respective RCS. As such, the pre-transfer overhead is greatly reduced.

The foregoing description has been directed to specific embodiments. It will be apparent to those with ordinary skill in the art that modifications may be made to the described embodiments, with the attainment of all or some of the advantages. For example, the schemes, data structures, and methods described herein can also be extended to other applications. More specifically, any type of data may be transferred utilizing embodiments of the present invention. Also, the transfer systems provisioned in accordance with embodiments of the present invention may be configured depending on a specific project, data types, number of users, size of files, location of users, and the like. Further, the routines described herein may be implemented utilizing Java programming techniques. Therefore, it is the object of the appended claims to cover all such variations and modifications as come within the spirit and scope of the invention.

What is claimed is:

1. A communication system comprising:
 a sender site including a database having:
  a trove section; and
  a transfer section;
 a file transfer system having:
  a trove reader to read the trove section and to perform a task selected from a group including: reading and marking each row in the trove section as "READ" once that row is read, setting a remote site counter in the trove section to a maximum number of spokes to which the sender site has to physically transfer the file delta, calculating the file delta based on a previous version of the file if the pending command is to save data, creating the delta file, insert a row in the transfer section for each spoke to which the delta file needs to be transferred, and duplicating contents of a respective row from the trove section into the transfer section; and
  a transfer reader to read the trove section and the transfer section, and to transmit a delta of a file at the sender site; and
 a receiver site to receive the file delta from the transfer reader, the receiver site having a file installer to patch a previously installed version of the file with the file delta.

2. The communication system of claim 1 wherein the file transfer system calculates a checksum for the file delta.

3. The communication system of claim 2 wherein the file transfer system sends both the file delta and the calculated checksum to appropriate plurality of remote sites.

4. The communication system of claim 2 wherein the checksum calculation is performed by the trove reader.

5. The communication system of claim 2 wherein the calculated checksum is stored in the transfer section.

6. The communication system of claim 1 wherein the file installer further checks the patched version of the file into a central directory.

7. The communication system of claim 1 further including an MD5 facility to verify whether the file delta has been installed by the file installer.

8. The communication system of claim 1 further including an MD5 facility to verify whether the file delta has been installed correctly by the file installer.

9. The communication system of claim 1 wherein the trove section is a table.

10. The communication system of claim 1 wherein the transfer section is a table.

11. The communication system of claim 1 further including an RCS for at least one of the sender site and the receiver site.

12. The communication system of claim 1 wherein the sender site further includes a send daemon to transfer the file delta.

13. The communication system of claim 1 wherein the sender site and the receiver site are configured in a hub and spoke network.

14. The communication system of claim 1 wherein the act of specifying the next time to install the transferred file on the receiver site is exponentially backed off for each subsequent try.

15. The communication system of claim 1 wherein the trove section includes at least one field selected from a group comprising TroveRowId; Command; ObjName; ObjId; Version; Branch; OriginSiteId; Priority; InsertTime; PredName; PredId; PredType; PredVer; PredBranch; FileSize; ToObjName; ToObjId; ToVersions; StorageType; DeltaFile; SiteCounter; ChkSum; and BBlock.

16. The communication system of claim 1 wherein the delta file is stored in a delta directory.

17. A system comprising:
- a sender site means including a database having:
  - a trove section; and
  - a transfer section;
- a file transfer system having:
  - a trove reader to read the trove section and to perform a task selected from a group including: reading and marking each row in the trove section as "READ" once that row is read, setting a remote site counter in the trove section to a maximum number of spokes to which the sender site has to physically transfer the file delta, calculating the file delta based on a previous version of the file if the pending command is to save data, creating the delta file, insert a row in the transfer section for each spoke to which the delta file needs to be transferred, and duplicating contents of a respective row from the trove section into the transfer section; and
  - a transfer reader means to read the trove section and the transfer section, and to transmit a delta of a file at the sender site; and
- a receiver site means to receive the file delta from the transfer reader, the receiver site having a file installer to patch a previously installed version of the file with the file delta.

18. The system of claim 17 further including MD5 means to verify whether the file delta has been installed by the file installer and to verify whether the file delta has been installed correctly by the file installer.

19. The system of claim 17 further including providing RCS means for at least one of the sender site and the receiver site.

* * * * *